(No Model.)
B. McGOVERN.
THILL COUPLING SPRING.
No. 393,019. Patented Nov. 20, 1888.
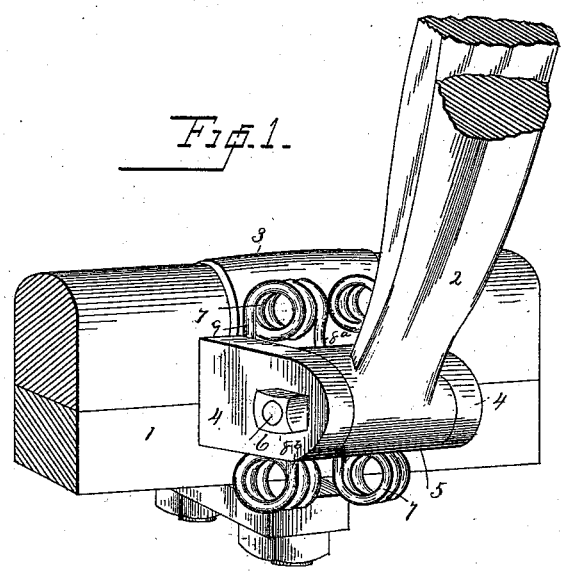
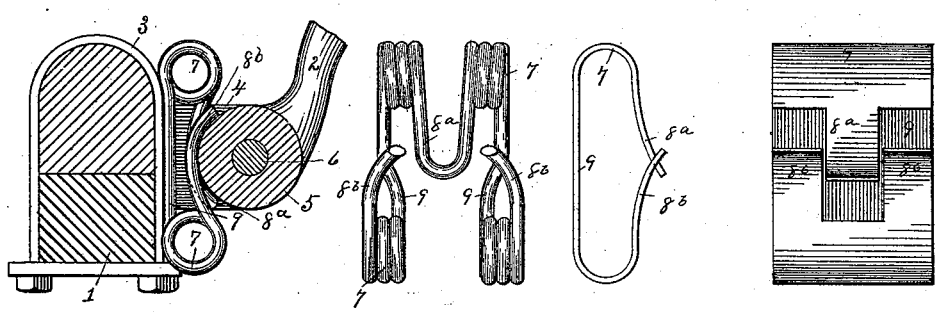
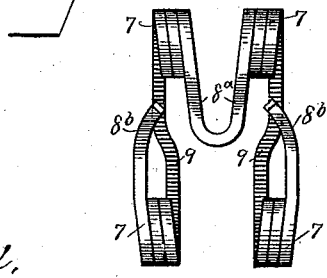
Witnesses:
W. A. Courtland,
B. E. Lee.
Inventor:
Bernard McGovern,
By A. M. Wooster,
Atty.

UNITED STATES PATENT OFFICE.

BERNARD McGOVERN, OF NORWALK, CONNECTICUT, ASSIGNOR TO NELSON TAYLOR, OF SAME PLACE.

THILL-COUPLING SPRING.

SPECIFICATION forming part of Letters Patent No. 393,019, dated November 20, 1888.

Application filed May 14, 1888. Serial No. 273,816. (No model.)

*To all whom it may concern:*

Be it known that I, BERNARD MCGOVERN, a citizen of the United States, residing at Norwalk, in the county of Fairfield and State of Connecticut, have invented certain new and useful Improvements in Thill-Coupling Springs; and I do hereby declare the following to be a full, clear, and exact description of the invention, such as will enable others skilled in the art to which it appertains to make and use the same.

My invention has for its object to provide a thill-coupling spring of the class commonly known as "anti-rattlers," which shall be simple in construction, easily applied to wagons in use, durable, and of slight first cost. Various classes of springs, both of metal and rubber, have heretofore been used for this purpose, but have failed, owing to inherent defects in construction and material, to perfectly accomplish the result aimed at. As the result of long-continued experiment, I have discovered that the wear upon the bolt and eye, which has been so imperfectly overcome by the different spring-couplings heretofore placed upon the market, is caused to a very slight extent only by the oscillation of the eye upon the bolt, but is almost entirely caused by the continuous vibration of the axle, to which the clip is necessarily attached. In order to overcome the effect of the continuous succession of blows of the eye upon the bolt, which is caused by the vibration of the axle when a wagon is in use, I interpose a spring-support between the eye and the clip, so constructed as not only to act in the vertical plane to hold the eye firmly against upward or downward movement and cause it to move with the axle both upward and downward, but to additionally act to force the eye forward against the bolt. I am thus enabled to hold the eye and bolt continuously together, so that the wear caused by oscillation of the eye is reduced to the minimum, and furthermore to prevent the continuous succession of blows of the eye upon the bolt caused by the vibration of the axle and bolt when the eye is not firmly held so as to move with them. This result has never been accomplished, so far as I am aware, by any metallic spring heretofore produced, and certainly not by any of the springs in which a block of rubber has constituted the element of resistance, it being of course understood that the rubber becomes quickly set and hard and of no more use in taking up vibration than a solid plug of any other material would be. In order to wholly overcome the objections stated to the anti-rattlers now in use, and to provide a device of this class which will hold the eye in the manner described, I have devised the novel construction of which the following description, in connection with the accompanying drawings, is a specification, numbers being used to denote the several parts.

Figure 1 is a perspective of a portion of an axle and the base of a thill, which is shown as connected to the axle by a clip of ordinary construction, my novel coupling-spring being shown in operative position; Fig. 2, a section of the axle, eye, and bolt, with the spring in elevation, showing the manner in which the crossed arms partially inclose the eye to hold it against either upward or downward movement. Figs. 3, 5, and 6 are elevations of different forms of my improved coupling-spring detached; and Fig. 4 is an edge view of the form shown in Fig 5.

1 denotes the axle, 2 the thill, 3 the clip, 4 the ears upon the clip, 5 the eye at the base of the thill, and 6 the bolt passing through the thill-eye and the ears upon the clip by which the parts are held together. These parts may be of the ordinary or any preferred construction.

7 denotes my novel coupling-spring as a whole, which is adapted to be placed between the eye and the clip, and which acts to hold the eye forward against the bolt passing through it, and also to hold the eye against any vertical movement independent of the axle.

The essential feature of my novel coupling-spring is an arm or arms which extend from the opposite ends of the spring inward past each other, and are curved so as to partially inclose the eye, the arms projecting from one end of the spring acting to hold the eye against independent movement upward and the other arm against independent movement downward.

In Figs. 1, 2, 3, and 6 I have shown the spring as formed from a single piece of wire, the center of said piece of wire forming one of the arms (denoted by 8ª) and the ends of the piece forming the other arms, (denoted by 8ᵇ.) When made of wire, coils are preferably formed at the bases of the arms to increase the strength and resiliency of the spring.

In Figs. 4 and 5 I have shown my novel coupling-spring as formed from a plate of spring metal having two arms denoted by 8ᵇ, as before, at one end, and a single arm denoted by 8ª, adapted to lie between them, as shown, formed at the other end. The completed spring is formed by curving over the opposite ends of the plate, as shown, the arms being curved as in the other form, so as to partially inclose the eye. The back of the spring—that is, the portion to which the arms are attached—is denoted by 9 in both forms.

The spring illustrated in Fig 6 is the same as in Fig. 3, except that square wire is used. This style of wire is preferred for the reasons that the general appearance of the completed spring is neater and more attractive, the amount of resiliency is increased without increasing the apparent size of the wire, and, most important of all, the bearing-surface of the spring is increased to such an extent as to practically do away with wear upon the thill-eye.

My improved spring may be readily inserted in place between the clip and the eye in wagons already in use, no tools whatever being required for the purpose, and will last as long as the wagon itself. I have found in practice that it is thoroughly efficient to accomplish the results aimed at.

It will of course be understood that various changes in the details of construction may be introduced without departing from the principle of my invention.

I claim—

1. A thill-coupling spring adapted to lie between the clip and eye, consisting of a back and spring-arms extending inward from the opposite ends thereof and passing each other, said arms being curved so as to partially inclose the eye, whereby the eye is held firmly against the bolt and is furthermore held against upward or downward movement independent of the axle.

2. A thill-coupling spring adapted to lie between the clip and eye, consisting of a back and spring-arms made from square wire, said arms curving inward from the ends of the back, whereby in use the eye is held firmly against the bolt and against upward or downward movement independently of the axle and wear upon the eye is prevented.

In testimony whereof I affix my signature in presence of two witnesses.

BERNARD McGOVERN.

Witnesses:
A. M. WOOSTER,
BERTHA E. LEE.